R. S. THORNTON.
ALFALFA MEAL GRINDER.
APPLICATION FILED AUG. 6, 1915.
1,167,858.
Patented Jan. 11, 1916.
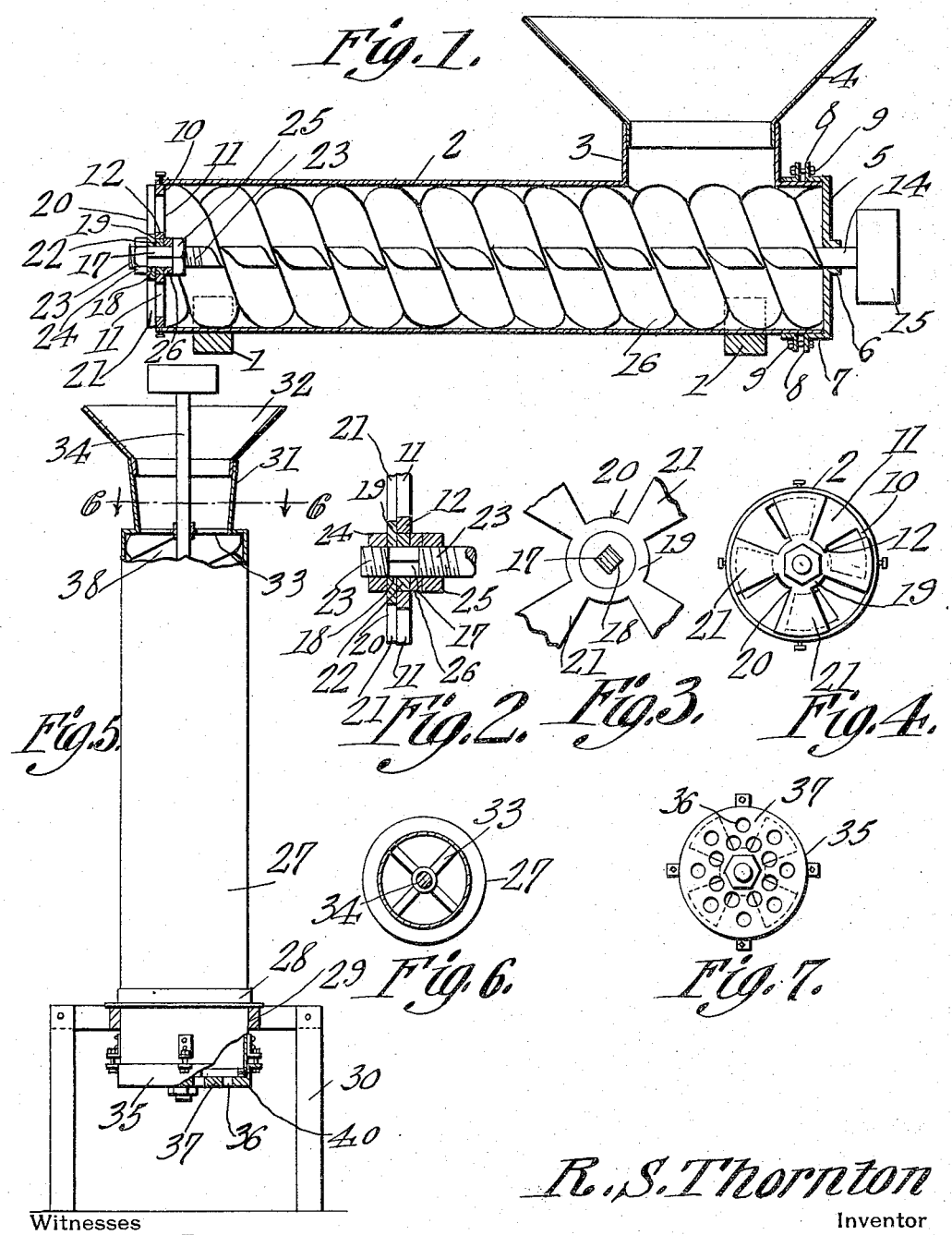
R. S. Thornton
Inventor
Witnesses

UNITED STATES PATENT OFFICE.

ROSS S. THORNTON, OF COZAD, NEBRASKA.

ALFALFA-MEAL GRINDER.

1,167,858.  Specification of Letters Patent.  Patented Jan. 11, 1916.

Application filed August 6, 1915. Serial No. 44,075.

*To all whom it may concern:*

Be it known that I, ROSS S. THORNTON, a citizen of the United States, residing at Cozad, in the county of Dawson and State of Nebraska, have invented a new and useful Alfalfa-Meal Grinder, of which the following is a specification.

By way of explanation it may be stated that the present method of preparing the product commercially known as "alfalfa meal" is to cut, dry and stack the alfalfa, the same in a dried condition being shipped to factories where the alfalfa is cut, ground or chopped into alfalfa meal, so called. The alfalfa plant comprises many small stems or leaves containing no small proportion of the food value of the plant. If the alfalfa is dried and shipped to a meal factory, these small stems and leaves, being dry, become detached, an appreciable and important portion of the food value of the resulting alfalfa meal being lost as a consequence.

In view of the foregoing, the present invention aims to provide a means whereby a farmer, either in the alfalfa field or in a closely adjoining building, may grind, cut or chop the alfalfa, in a green condition, into alfalfa meal, thereby avoiding at once the loss of portions of the alfalfa which drop away when in a dried condition, and avoiding further, the many disadvantages arising out of that process which consists in drying the alfalfa and shipping the same (often a considerable distance) to an alfalfa meal mill.

From the view point of a specifically novel structure, the present invention aims to improve the cutting mechanism, to improve the means for feeding the alfalfa to the cutting mechanism, and to provide novel means for mounting and operating both the cutting and the feeding instrumentalities.

It is within the province of the disclosure to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows in vertical longitudinal section, an alfalfa meal grinder embodying the present invention; Fig. 2 is a detail enlarged from Fig. 1; Fig. 3 is an end elevation showing the cutting means in place on the actuating shaft; Fig. 4 is an end elevation of the shell and the cutting means carried thereby; Fig. 5 is an elevation showing a modified form of the invention, parts being broken away; Fig. 6 is a cross section on the line 6—6 of Fig. 5; Fig. 7 is a bottom plan showing the shell and parts carried thereby.

In carrying out the present invention and referring specifically to Figs. 1, 2, 3 and 4, there is provided a supporting structure 1 of any desired sort. Upheld by the supporting structure 1 is a shell 2 of cylindrical outline and disposed in a substantially horizontal position. Adjacent one end, the shell 2 is equipped with an upstanding neck 3 coöperating with a hopper 4.

Applied to one end of the shell 2 is a head 5 including a bearing 6 and provided with an outstanding flange 7. Brackets 8 are mounted on the shell 2, the brackets being connected with the flange 7 by bolts 9. It is to be understood, however, that any suitable means may be provided for assembling the head 5 with the shell. The opposite end of the shell 2 is equipped with a spider comprising a rim 10, radial arms 11 and a bearing 12.

The numeral 14 designates a shaft equipped with suitable driving means 15 of any desired sort, the shaft carrying a worm conveyer 16 disposed within the shell 2. The shaft 14 adjacent one end is journaled in the bearing 6, and near its other end, the shaft is provided with a polygonal intermediate portion 17 adapted to be received in a correspondingly shaped opening 18 formed in the hub 19 of a cutter 20 embodying radiating cutting arms 21. In the present instance, the cutter has been shown as in contact with the outer face of the spider 10—11—12. The polygonal intermediate portion 17 of the shaft 14 is received in a correspondingly shaped opening formed in a collar 22 of circular outline and journaled in the bearing 12. The shaft 14 is threaded on both sides of the intermediate portion 17 as shown at 23. A nut 24 is threaded onto the outer end of the shaft 14 and coacts with the cutter 20 to hold the same in engagement with the spider 10—11—12. A nut 25 is threaded onto the shaft 14 and coacts with a spacer 26 interposed between the nut 25 and the collar 22.

In practical operation, the alfalfa, in a green condition is fed into the shell 2 through the hopper 4 and the neck 3, the alfalfa being advanced by the worm conveyer 16. The worm conveyer 16 is so shaped peripherally, that it will cut any stalks of alfalfa which happen to be lodged between the periphery of the conveyer and the shell 2. The alfalfa is fed by the conveyer 16 to the spider 10—11—12 and is cut, ground or pulverized, by the action of the member 20, it being understood that this element of the structure may be shaped as the exigencies of the proposed use may demand.

It is within the province of the invention that the cutter 20 be placed against the inner face of the spider 10—11—12, instead of against the outer face thereof, as shown in Fig. 1. Under such circumstances, the cutter 20 and the spacer 26 are interchanged, the spacer 26 engaging the outer face of the spider, and the cutter engaging the inner face of the spider. The worm conveyer 16, if best results are to be obtained, must be in abutment with the spider 10—11—12 when the cutter 20 is located on the outside of the spider, and must be in abutment with the cutter 20, when the cutter 20 is located adjacent the inner face of the spider. If the cutter 20 is interposed between the spider and the end of the conveyer 16 then the conveyer must be moved slightly to the right, referring to Fig. 1. In order to permit this necessary movement of the conveyer to the right, when the cutter 20 lies inside of the spider, the bolts 9 may be loosened slightly, and the head 5 is backed off the necessary amount.

In Fig. 5 of the drawings there is shown a modified form of the invention, wherein the shell 27 is vertically disposed, the shell carrying a supporting collar 28 adapted to coöperate with a ring 29 constituting a part of a frame 30. The frame 30 need not be employed, a suitable support of any desired sort being substituted therefor. The upper end of the shell 27 is equipped with a neck 31 coöperating with a hopper 32. Disposed within the upper end of the shell 27 is a spider 33 in which a shaft 34 is mounted, the same carrying a worm conveyer 38 of the sort hereinbefore described. The numeral 35 serves to designate generally, the structure shown at the left hand end of Fig. 1, and delineated in detail in Fig. 2, the parts remaining unchanged, saving for the fact that the spider 10—11—12 is replaced by an end plate 37, the openings 36 of which are slightly smaller than the openings in the spider 10—11—12. In Fig. 5 of the drawings, the cutter 40 has been shown as disposed inside of the end plate 37.

From the foregoing it will be understood that a person provided with either of the grinders shown in this application, may convert alfalfa, in a green condition, into alfalfa meal, upon his own premises, thereby avoiding all of the disadvantages attendant upon drying and shipping the alfalfa to be used for that purpose.

Having thus described the invention, what is claimed is:—

1. In a device of the class described, a shell; a spider carried by one end of the shell; a head carried by the other end of the shell; a shaft journaled in the head and in the spider; a conveyer on the shaft and abutting at its ends against the head and the spider; a removable cutter on the shaft and engaging the outer face of the spider, the shaft having polygonal portions lying upon opposite sides of the spider whereby the cutter may be connected with the shaft interchangeably to engage with the inner and the outer faces of the spider; the head being mounted for adjustment longitudinally of the shell; and means for holding the head in adjusted positions longitudinally of the shell thereby to permit a retraction of the shaft and the conveyer and to permit the conveyer to abut against the head and the cutter when the cutter coacts with the inner face of the spider.

2. In a device of the class described, a shell provided at one end with a spider; a collar journaled for rotation in the spider; a shaft having a polygonal portion received in the collar, and threaded at the ends of the polygonal portion; a cutter mounted on the polygonal portion of the shaft; a spacer mounted on the polygonal portion of the shaft, the cutter and the spacer being interchangeable to engage with the respective faces of the spider; and nuts on the threaded portions of the shaft and coöperating, respectively with the cutter and with the spacer.

In testimony that I claim the foregoing as my own, I have hereto affixed my signature in the presence of two witnesses.

ROSS S. THORNTON.

Witnesses:
H. JENSEN,
NEIL FRANCE.

Copies of this patent may be obtained for five cents each, by addressing the "Commissioner of Patents, Washington, D. C."